United States Patent [19]

Kuo

[11] Patent Number: 5,548,430
[45] Date of Patent: Aug. 20, 1996

[54] FLICKERPROOF RETAINING STRUCTURE FOR A LIQUID CRYSTAL DISPLAY HAVING A FRAME BELOW THE SEAL

[75] Inventor: Chunge-De Kuo, Taipei, Taiwan

[73] Assignee: Kinpo Electroncis, Inc., Taipei, Taiwan

[21] Appl. No.: 348,429

[22] Filed: Dec. 2, 1994

[51] Int. Cl.$^6$ .................... G02F 1/1333; G02F 1/1339
[52] U.S. Cl. .................................. 359/80; 359/83
[58] Field of Search .................... 359/83, 89, 80

[56] References Cited

U.S. PATENT DOCUMENTS

| | | | |
|---|---|---|---|
| 4,189,912 | 2/1980 | Washizuka et al. | 359/83 |
| 4,359,222 | 11/1982 | Smith, III et al. | 359/83 |
| 4,826,296 | 5/1989 | Yoshimura | 359/83 |

*Primary Examiner*—William L. Sikes
*Assistant Examiner*—Ron Trice
*Attorney, Agent, or Firm*—Pro-Techtor International

[57] ABSTRACT

A flickerproof retaining structure for a liquid crystal display is disclosed. The retaining structure comprises an elastic pad disposed under a lower face of the display and a peripheral supporting frame located under the elastic pad to support the same. The peripheral supporting frame is formed on a housing and profiled corresponding to a peripheral sealed portion of the display. The peripheral supporting frame has an upper edge portion supporting and abutting against a bottom face of the sealed portion of the display, whereby a housing deforming force such as key depressing force exerted on said housing will be only transmitted through the peripheral supporting frame and the elastic pad to the sealed portion of the display without compressing a liquid crystal zone of the display so that no flickering of characters displayed on the display will take place due to the housing deforming force.

2 Claims, 2 Drawing Sheets

FLICKERPROOF RETAINING STRUCTURE FOR A LIQUID CRYSTAL DISPLAY HAVING A FRAME BELOW THE SEAL

BACKGROUND OF THE INVENTION

The present invention relates to a flickerproof retaining structure for a liquid crystal display, and more particularly to a retaining structure which is able to eliminate the stress exerted on the liquid crystal zone of the display panel and thus prevent the displayed characters from flickering. The retaining device also provides a protecting effect for the display.

In the existing electronic equipments, a liquid crystal display is widely used for displaying characters, numbers and pictures. Such liquid crystal display is composed of a layer of liquid crystal sandwiched between two layers of transparent glass. The periphery of the sandwich structure is sealed by adhesive agent and a display panel is defined within the sealed periphery. The liquid crystal display is retained in a manner which varies with the structures of the display. The retaining device for the display is mostly combined with the housing of the display to prevent the display panel from being deflected left or right. Such tight combination often results in that when the input keys are operated, the characters or the like displayed on the display panel flicker to affect the displaying effect. This is because that the upper and lower layers of transparent glass of the display suffer external force unevenly. In the traditional retaining measure for the liquid crystal display, a layer of elastic material is paved directly on the screen-like retaining seat located under the display. According to such arrangement, the housing will be deformed due to the key depressing force to compress the liquid crystal zone of the display. This will lead to serious flickering of the characters. Especially, currently the manufactures of the display tend to reduce the volume of the electronic equipment, so that the flickering the characters displayed on the display will be even more closely related to the combination relationship between the liquid crystal display and the housing. Some attempts have been made to solve the problem of flickering of the characters displayed on the liquid crystal display resulting from the external force exerted on the housing. For example, Taiwan Patent Application Publication No. 188419 discloses a retaining measure for preventing the liquid crystal display from being deflected left or right. However, these attempts all have complicated structure and fail to effectively eliminate the flickering of the characters.

SUMMARY OF THE INVENTION

It is therefore a primary object of the present invention to provide an improved flickerproof retaining structure for the liquid crystal display, which is able to effectively eliminate the flickering of the characters displayer on the display during the operation of the input keys.

The present invention can be best understood through the following description and accompanying drawings, wherein:

DETAILED DESCRIPTION OF THE PREFERRED EMBODIMENT

Figure 1:
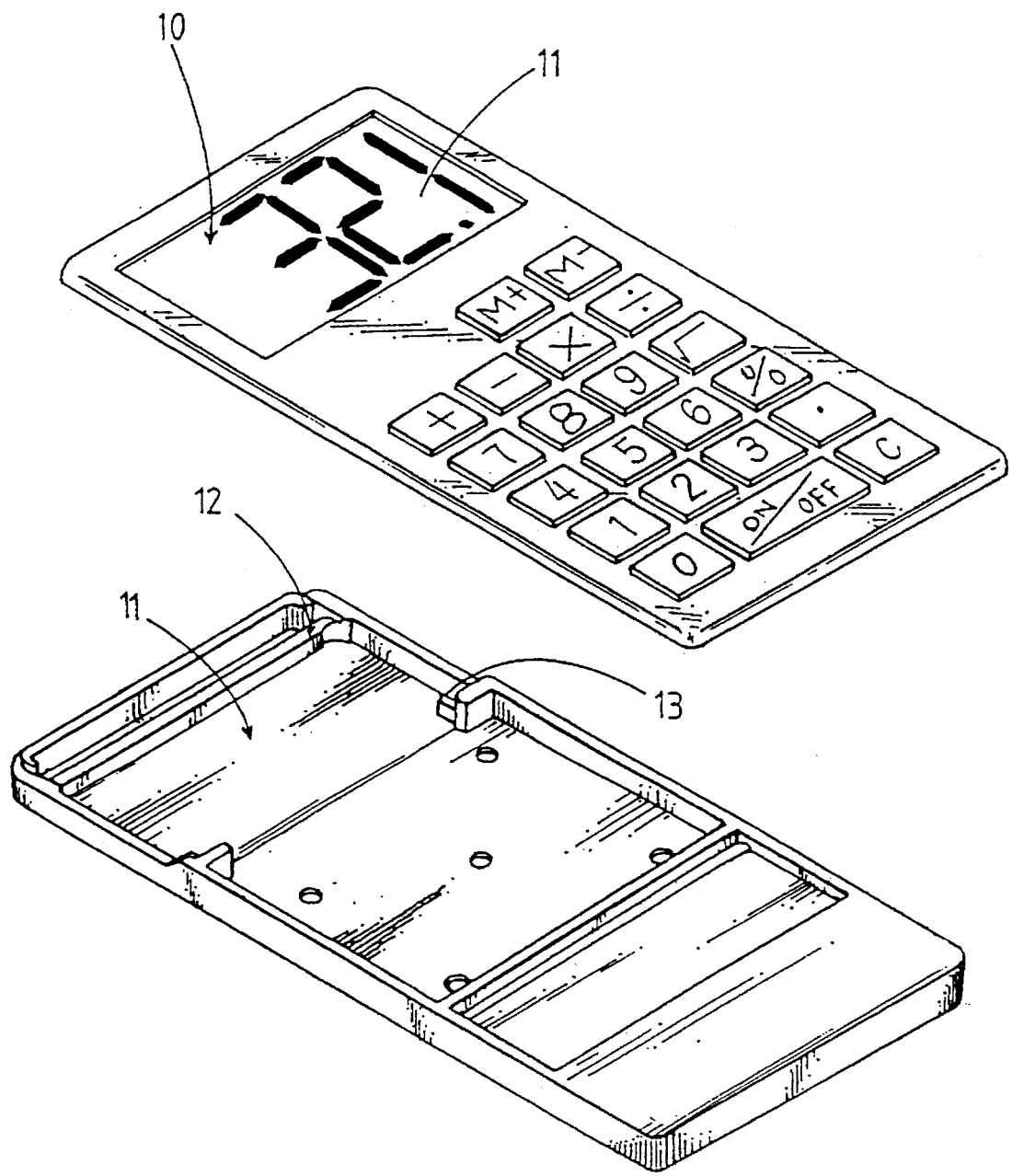
FIG. 1 is a perspective exploded view of a traditional calculator including a liquid crystal display.

Please refer to FIG. 1. It is known that a liquid crystal display 10 is conventionally usually disposed within a window 11 of an electronic device such as a calculator as shown in FIG. 1. The display 10 is clamped and retained by an integral base portion of the housing of the electronic device. As a result, the display 10 is liable to be affected by the operation of the input keys. This often leads to flickering of the characters displayed on the display 10. Moreover, the display 10 is composed of a liquid crystal layer 14 sandwiched between an upper layer and a lower layer of transparent glass 12, 13. The periphery of the liquid crystal layer 14 and the upper and lower layers of transparent glass 12, 13 is sealed by adhesive agent to form a sealed portion 15 which binds the liquid crystal layer 14 in the display 10.

Figure 2:
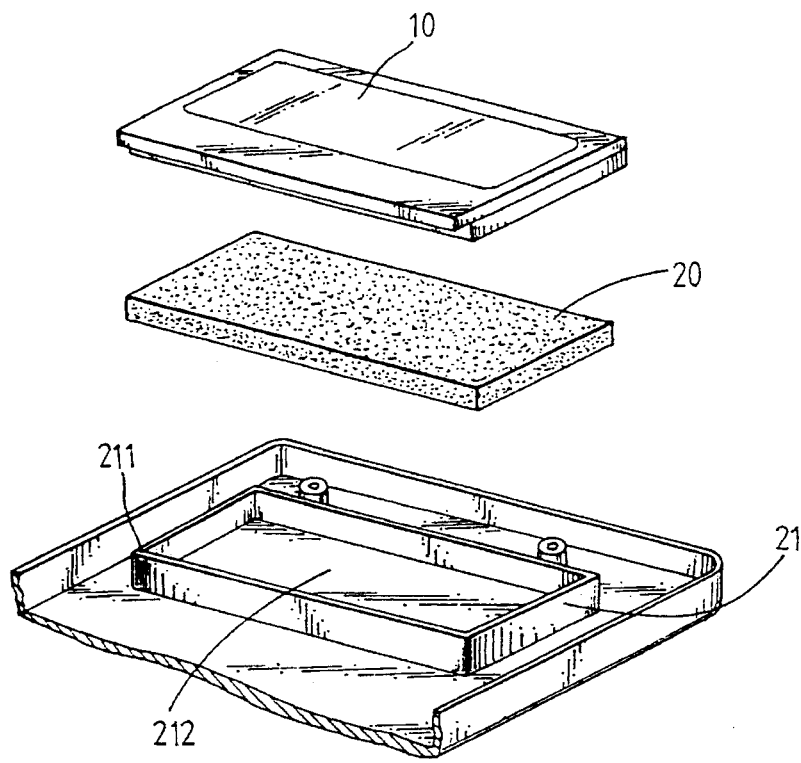
FIG. 2 is a perspective exploded view of the present invention.
Figure 3:
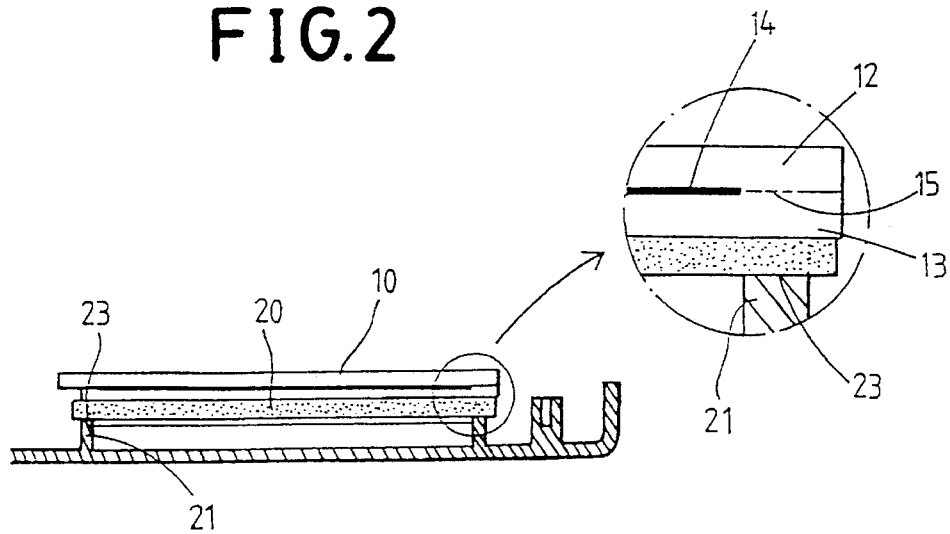
FIG. 3 is a sectional side view of the present invention.

Please refer to FIGS. 2 and 3. The retaining structure of the present invention includes at least an elastic pad 20 and a peripheral supporting frame 21 supporting and abutting against the elastic pad 20. The elastic pad 20 is disposed under a bottom face of the lower layer of glass 13 while over the peripheral supporting frame 21. The peripheral supporting frame 21 has an edge portion 211 which is profiled corresponding to the sealed portion 15 of the display 10. Accordingly, the external force such as the key depressing force exerted on the housing of the electronic device will not compress and affect the liquid crystal display 10 by reason that the housing deforming force will be transmitted first through the peripheral supporting frame 21 and the elastic pad 20 and then to the sealed portion 15 without compressing the liquid crystal zone of the display 10. The peripheral supporting frame 21 will effectively resist the deforming force and the elastic pad 20 will buffer the remaining deforming force. In addition, the deforming force is only transmitted to the sealed portion 15 of the display 10 so that the liquid crystal zone will not be affected by the deforming stress and thus no flickering of the displayed characters will take place and a normal displaying function is maintained.

In conclusion, the retaining structure of the present invention is able to effectively prevent the characters displayed on the liquid crystal display from flickering due to external operation force.

It should be noted that the above embodiment is only used for illustration purpose and is not intended to limit the scope of the present invention. The scope of the present invention should be defined only by the appending claims.

What is claimed is:

1. A flickerproof retaining structure for a liquid crystal display, comprising a peripheral supporting frame which is on a housing and profiled corresponding to a peripheral sealed portion of said display, said peripheral supporting frame having an upper edge portion supporting and abutting against a bottom face of said sealed portion of said display, whereby a housing deforming force exerted on said housing will be only transmitted through said peripheral supporting frame to said peripheral sealed portion of said display without compressing a liquid crystal zone of said display so that no flickering of characters displayed on said display will take place.

2. A flickerproof retaining structure as claimed in claim 1, wherein a layer of elastic material is disposed between said peripheral sealed portion of said display and said peripheral supporting frame for buffering said housing deforming force.

* * * * *